US012646765B2

(12) United States Patent
Sloop et al.

(10) Patent No.: US 12,646,765 B2
(45) Date of Patent: Jun. 2, 2026

(54) PROCESSING A BATTERY ELECTRODE ASSEMBLY TO RECOVER ELECTRODE MATERIAL

(71) Applicant: HULICO LLC, Bend, OR (US)

(72) Inventors: Steven E. Sloop, Bend, OR (US); Lauren E. Crandon, Bend, OR (US)

(73) Assignee: HULICO LLC, Bend, OR (US)

( * ) Notice: Subject to any disclaimer, the term of this patent is extended or adjusted under 35 U.S.C. 154(b) by 857 days.

(21) Appl. No.: 17/819,267

(22) Filed: Aug. 11, 2022

(65) Prior Publication Data

US 2023/0070883 A1 Mar. 9, 2023

Related U.S. Application Data

(60) Provisional application No. 63/232,129, filed on Aug. 11, 2021.

(51) Int. Cl.

| | |
|---|---|
| ***H01M 10/54*** | (2006.01) |
| ***C22B 26/12*** | (2006.01) |
| ***H01M 4/62*** | (2006.01) |

(52) U.S. Cl.

CPC ............. *H01M 10/54* (2013.01); *C22B 26/12* (2013.01); *H01M 4/623* (2013.01)

(58) Field of Classification Search

CPC ........ H01M 10/54; H01M 4/623; C22B 26/12

See application file for complete search history.

(56) References Cited

U.S. PATENT DOCUMENTS

| | | | | |
|---|---|---|---|---|
| 5,491,037 A | 2/1996 | Kawakami | | |
| 5,549,880 A * | 8/1996 | Koksbang | H01M 4/485 | 423/594.15 |
| 6,811,923 B1 * | 11/2004 | Sakai | H01M 10/54 | 429/231.1 |
| 2007/0048435 A1 * | 3/2007 | Suzuki | H01M 4/587 | 427/430.1 |

(Continued)

FOREIGN PATENT DOCUMENTS

| | | | | |
|---|---|---|---|---|
| CN | 112786837 A * | 5/2021 | H01M 4/0404 | |
| JP | H09255340 A * | 9/1997 | H01M 4/485 | |
| JP | H10255862 A * | 9/1998 | H01M 10/54 | |

OTHER PUBLICATIONS

EPO machine generated English translation of JP-H10255862-A (Year: 1998).*

(Continued)

*Primary Examiner* — Kimberly Wyluda
(74) *Attorney, Agent, or Firm* — Alleman Hall LLP

(57) ABSTRACT

Examples are disclosed that relate to methods and reactors for recycling a positive electrode material of a lithium-ion battery. One example provides a method of recycling a positive electrode material of a lithium-ion battery. The positive electrode material comprises a metal m having a n+ oxidation state ($m^{n+}$). A reaction mixture is formed comprising the positive electrode material, an oxidizing agent, and lithium ions. The positive electrode material is electrochemically replenished with lithium via electrochemical reduction of the lithium ions while maintaining the n+ oxidation state of the metal m in the positive electrode material via the oxidizing agent.

18 Claims, 5 Drawing Sheets

(56) References Cited

U.S. PATENT DOCUMENTS

| | | | | |
|---|---|---|---|---|
| 2011/0272331 A1* | 11/2011 | Ellis | H01M 10/54 209/166 |
| 2016/0072162 A1 | 3/2016 | Kepler et al. | |
| 2016/0372802 A1 | 12/2016 | Chiang et al. | |
| 2019/0260100 A1* | 8/2019 | Sloop | H01M 4/131 |

OTHER PUBLICATIONS

EPO machine generated English translation of JP-H09255340-A (Year: 1997).*

EPO machine generated English translation of CN-112786837-A (Year: 2021).*

ISA United States Patent and Trademark Office, International Search Report and Written Opinion Issued in Application No. PCT/US22/74869, Nov. 18, 2022, 7 pages.

Bai, Y. et al., "Sustainable direct recycling of lithium-ion batteries via solvent recovery of electrode materials," ChemSusChem, vol. 13, No. 21, Jul. 31, 2020, 26 pages.

* cited by examiner

100

FORM A SOLUTION COMPRISING A METAL ALKOXIDE — 102

FORM FROM METAL SOURCE AND AN ALCOHOL — 104

SOLUTION COMPRISES CARBON DIOXIDE — 105

ADD BATTERY ELECTRODE ASSEMBLY TO SOLUTION — 106

SEPARATING THE ELECTRODE MATERIAL FROM THE CURRENT COLLECTOR — 108

HEAT THE SOLUTION — 110

AGITATE THE SOLUTION — 112

RECOVER THE ELECTRODE MATERIAL — 114

PROCESSING A BATTERY ELECTRODE ASSEMBLY TO RECOVER ELECTRODE MATERIAL

CROSS-REFERENCE TO RELATED APPLICATION

This application claims priority to U.S. provisional application No. 63/232,129 entitled PROCESSING A BATTERY ELECTRODE ASSEMBLY, filed Aug. 11, 2021, the entire contents of which are hereby incorporated by reference for all purposes.

TECHNICAL FIELD

The present application relates to the field of lithium-ion batteries, and more particularly, to removing binder material from a battery electrode assembly.

BACKGROUND

Lithium-ion batteries provide power to products ranging from automobiles to smart phones. These batteries are rechargeable over many cycles, tolerant to various environmental factors, and have a relatively long useful lifetime. Nevertheless, they eventually fail or are discarded prior to failure, and therefore contribute to a significant waste stream. Thus, environmental regulations, industry standards, and collection services have arisen to promote the recycling of lithium-ion batteries.

SUMMARY

Examples are disclosed that relate to processing a battery electrode assembly. One example provides a method of processing a battery electrode assembly comprising a current collector, an electrode material, and a binder, the method comprising adding the battery electrode assembly to a solution comprising a lithium alkoxide, separating the electrode material from the current collector, and recovering the electrode material.

DETAILED DESCRIPTION

Figure 1:
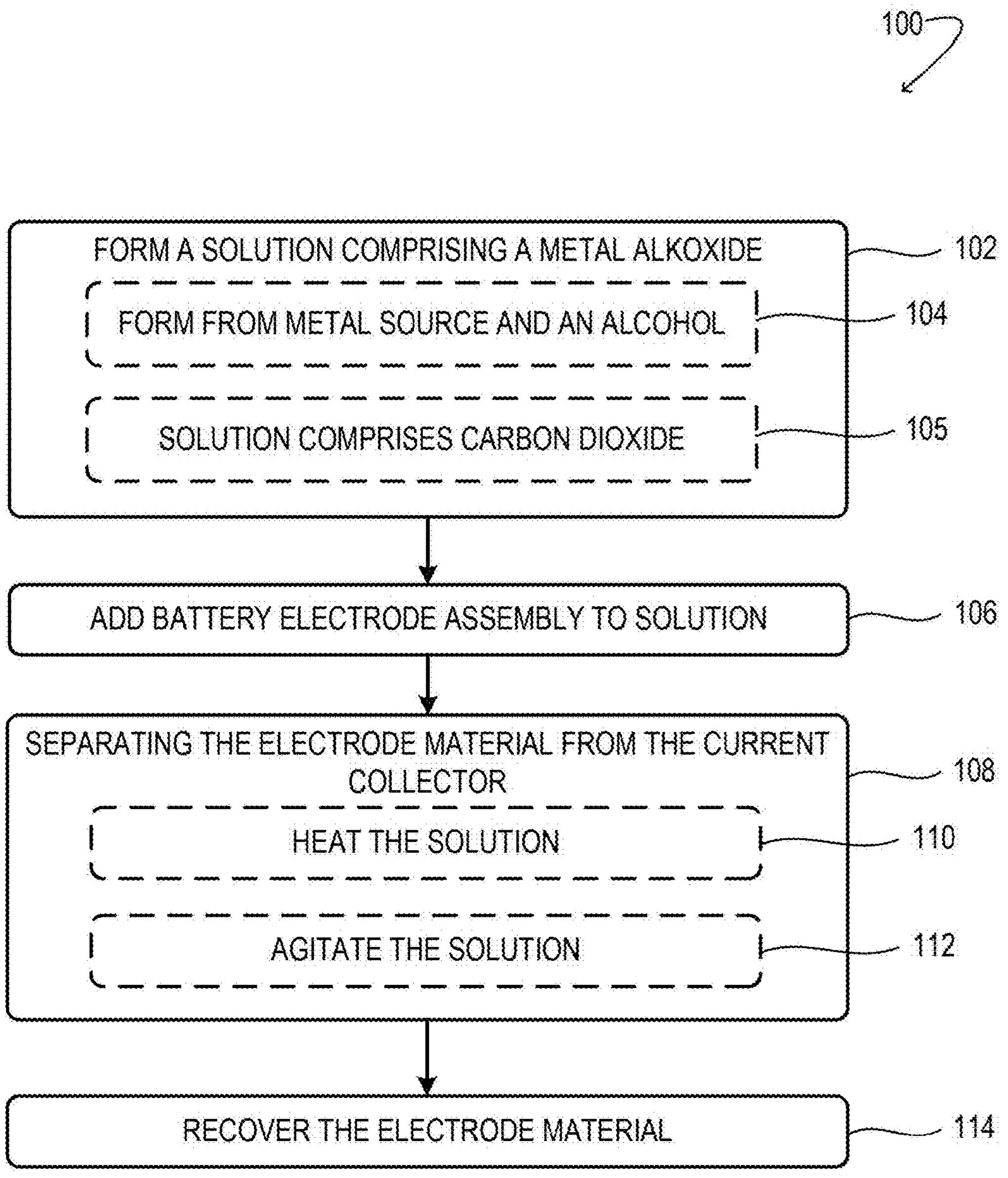
FIG. 1 shows a flow diagram illustrating a method of recycling an electrode material of a lithium-ion battery.

A battery electrode assembly comprises a current collector with electronic connectivity to an active electrochemical material with ionic conduction to an electrolyte. Multiple layers of active electrode material may have relatively high resistance due to dislocations and long paths for electronic conduction. To reduce the resistance, conductive carbon additives, such as carbon black, graphite, carbon nanotubes, and/or graphene, may be used. However, because the electrode and additive powders move relatively easily, and movement may result in performance loss or manufacturing difficulty, various polymeric materials have been developed to bind particles into place and adhere the mixture to a current collector. Polyvinylidene fluoride (PVDF) is an example of a binder used throughout the battery manufacturing industry. Other binders include polymethyl cellulose, styrene butadiene rubber (SBR), polyethylene imine (PEI), single-ion conductors, ionomers, and copolymeric combinations.

Recycling lithium-ion battery electrode assemblies may include processes to separate the electrode material from the current collector. There are three general approaches to liberate bound particles: (1) chemical decomposition, (2) physical dissolution of the polymer binder and (3) physical dislocation of particles from the polymer matrix via thrashing, blending, ultrasonic action, etc. An example of the first two are taught by U.S. Pat. No. 6,150,050 (Matthew et al.), where thermal decomposition of PVDF is achieved by heating coated electrodes to 200-500° C., which activates the formation of HF gas from covalently bound H and F along the polymer backbone and results in breaking carbon-carbon bonds that decrease the macromolecular size and function of PVDF. Oxygen in the air is sufficient to further decompose the polymer to carbon dioxide and water.

Dissolution or swelling of PVDF may be achieved through exposure to n-methyl pyrrolidone, or solutions thereof (e.g. N-Methyl-2-pyrrolidone (NMP)/acetone). Other solvents that may be suitable for dissolving PVDF include dimethylformamide (DMF), propylene carbonate, high-pressure $CO_2$, and other environmentally friendly solvents. Dissolution of the macromolecule of PVDF releases the weakly bound electrode particles that can be subsequently collected via filtration for reuse or refining, and the polymer can be isolated for reuse as well. As an example, Soxhlet extraction is a method and device used to isolate polymers from mixtures. Soxhlet extraction can be used to circulate NMP (or another solvent) to remove PVDF from electrode mixtures.

The processability of PVDF is a challenge due to its limited solubility and high level of thermal stability. Thermal decomposition of PVDF generates harmful HF; however, this can be mitigated through the addition of a base. For example, heating PVDF in an aqueous solution of LiOH produces LiF as a byproduct of polymer decomposition, as shown below in Equation 1. Other basic metal oxides or hydroxides have similar reactivity.

(Eq 1)

$$(CF_2CH_2)_n + LiOH \longrightarrow LiF + H_2O + (CF{=}CH_2) \xrightarrow[OH^-]{} \xrightarrow[OH^-]{} \xrightarrow[OH^-]{} LiF + CO_2 + H_2O$$

Many battery architectures use aluminum foil for the current collector. With PVDF bound to Al substrates, the use of a base to remove the polymer may result in side reactions that are difficult to handle. For example, Al reacts with an aqueous base to produce $H_2$, the flammability of which poses industrial hazards that require significant capital investments for safety management. Furthermore, the aluminum hydroxide byproduct becomes a source of contamination for any refined product while recycling the electroactive lithium-metal-oxides (ELMOs). An example reaction of Al in an aqueous base is shown below in Equation 2.

$$Al + LiOH + H_2O \longrightarrow LiAlO_2 + 3/2\ H_2 \xrightarrow[OH^-]{} [Al(H_2O)_2(OH)_4]^- \qquad \text{(Eq 2)}$$

Dissolution of PVDF avoids the side reactions, but effective solvents, such as NMP, have environmental health and safety toxicity challenges. Green solvents, such as ethylene glycol, dimethyl sulfoxide (DMSO), and triethyl phosphate (TEP) require high heat and can be very slow or incomplete in the removal of PVDF.

Accordingly, the disclosed examples relate to the use of low-cost, environmentally friendly alkoxides to decompose binders (including PVDF) of lithium battery electrode assemblies without Al side reactivity. Briefly, the disclosed examples utilize a solution of a metal alkoxide, which may be formed from a metal source and an alcohol. Decomposition of the binder separates the electrode material from the current collector, and the electrode material can then be recovered for reuse. While disclosed in the context of PVDF binders as an example, it will be understood that the disclosed examples also may be used to help remove other binders, such as polyvinyl chloride (PVC), polytetrafluoroethylene (PTFE), styrene-butadiene rubber (SBR), polymethyl cellulose (PMC), or other halide-including battery binders.

FIG. 1 shows a flow diagram depicting an example method 100 of treating an electrode assembly. It will be understood that various steps of method 100 may be omitted or performed in a different order than described, and that additional steps also may be included. At 102, method 100 may comprise forming a solution comprising a metal alkoxide comprising one or more metals M, where M is Li, Na, K, Rb, Cs, Be, Mg, Ca, Sr, and/or Ba. The metal alkoxide can be formed from a metal source and an alcohol, at 104. In various examples, the metal source can include a native metal, a metal oxide, metal carbonate, metal hydroxide, and/or any other suitable metal compounds. In examples where a lithium-ion battery is being processed, lithium alkoxide may be particularly suitable for use, as the metal alkoxide to maintain purity with the use of a common ion. Any suitable alcohol can be used, including ethanol, methanol, propanol, propane diol, ethylene glycol, glycerol, and polyvinyl alcohol, as examples. Ethylene glycol, for example, may further provide the benefit of temperature controllability. In some examples, the metal alkoxide solution may be formed during treatment of the electrode assembly. For example, the battery electrode assembly may be added to a vessel comprising an alcohol (which may comprise a polyol in some examples), and then a metal source mixed into the alcohol to form the metal alkoxide. In other examples, a pre-formed metal alkoxide solution may be used. The metal alkoxide may be added in a batch process or a continuous flow process in various examples. Examples of forming a solution of a metal alkoxide, specifically a lithium alkoxide, will be described in further detail below. The metal alkoxide may be non-aqueous or aqueous. In some examples, depending on the binder of the battery being processed, additional materials may be added to the solution. For example, a methacrylate such as poly(ethylene glycol), other PEGs, alcohols, and/or other suitable soluble agents may be added to further dissolution of the binder in an aqueous environment. The metal alkoxide may be formed in-situ with evaporative condensation of the alcohol onto the electrode assembly mixed with the alkoxide precursor (such as lithium hydroxide or any of the above examples) in a Soxhlet or other condenser. In some examples, propylene carbonate is added to the solution.

In some examples, at 105, the solution comprises carbon dioxide ($CO_2$). For example, pressurized liquid $CO_2$ or supercritical $CO_2$ can be used to swell the binder to promote delamination from the current collector and remove the binder. In some examples, $CO_2$ may form a carbonate which can help to avoid hydrogen production from the reaction of a base with aluminum, while still achieving delamination of the binder. In some examples, $CO_2$ is used alone. In other examples, $CO_2$ is used as a co-solvent together with one or more other solvents, such as ethylene glycol, propylene glycol, an alkoxide, or carbonate solvent. Examples of suitable carbonate solvents include propylene carbonate, ethylene carbonate, dimethyl carbonate, diethyl carbonate, ethyl methyl carbonate, t-butyl carbonate, and poly(ethylene glycol) carbonate (n=1-10). In some examples, a carbonate solvent alone (e.g. propylene carbonate, ethylene carbonate as examples), or a mixture of a carbonate solvent with a glycol and/or alkoxide, can be used. Examples of other solvents that can be used with $CO_2$ include acetone, acetyl triethyl citrate, γ-butyrolactone, cyclohexanone, cyclopentanone, dibutyl phthalate, dibutyl sebacate, diethyl phthalate, dihydrolevoglucosenone, dimethylacetamide, N,N-dimethylformamide, dimethyl sulfoxide, 1,4-dioxane, ethyl acetate, 3-heptanone, hexamethyl phosphoramide, 3-hexanone, methyl ethyl ketone, N-methyl-2-pyrrolidone, 3-octanone, 3-pentanone, tetrahydrofuran, tetramethylurea, triacetin, tri-alkyl phosphate (e.g., trimethyl phosphate, triethyl phosphate), triethyl citrate, N,N' tetrabutylsuccindiamide, and water. Use of $CO_2$ as a co-solvent may help reduce processing temperature.

Next, method 100 comprises, at 106, adding the battery electrode assembly to the solution, and at 108, separating the electrode material from the current collector. To help the separation, method 100 may optionally comprise heating the solution, at 110, for example to temperatures of 60 to 150° C., and in some examples up to 250° C. In some examples, where the solution comprises a carbonate such as propylene carbonate, heating the solution at 110 may optionally comprise heating the solution to a temperature that is below the flash point of the carbonate. Further, method 100 may optionally comprise agitating the solution (e.g. stirring), at 112. The final agitation may occur in LiOH/water solution or another suitable solution for easy thrashing to remove the electrode material, such as any basic aqueous solution of pH 7-14 with or without a surfactant added to aid flotation of carbonaceous material. As examples, the thrashing solution could include a nonaqueous media such as methanol, ethanol, isopropyl alcohol, any low viscosity fluid (<1 mPas which is water at 20° C.; ethylene glycol is 16 mPas at 20° C.), or density separation fluid for carbon/metal oxide (e.g. bromoform, alkali-tungstate solution). In such an example, the alkoxide may help to loosen the binder, and then the thrashing may be performed in a less viscous, cooler solution. In some examples, such as where $CO_2$ is used as a co-solvent at 105, light agitation in water can be performed to remove the electrode material.

Method 100 further comprises, at 114, recovering the electrode material, for refining and eventual reuse, for example. Recovery may include drying the electrode material, or keeping the electrode material wet for downstream processing. The solution of metal alkoxide may be reusable as is, or can be reused after adding or forming more replacement metal alkoxide.

The disclosed examples may provide various benefits. First, the use of an alkoxide may result in more complete separation of the aluminum from the laminate. In contrast, existing solvents, such as alkyl phosphate, n-methyl pyrrolidone, etc. may not cleanly separate the Al from the laminate, but instead may leave some residue on the Al. Second, the waste product from alkoxy is an alcohol, which may be easier to manage than TEP or NMP. Third, the disclosed examples provide flexibility in activating alkoxy in situ and deactivating after delamination, which may allow for relatively simple logistics, e.g. in the use of ethylene glycol. Fourth, the use of the alkoxide may also help to prevent damage to the Al electrode material, and the disclosed processes can be performed at relatively low temperatures. Fifth, the use of propylene carbonate in the solvent may help achieve delamination at temperatures below the flashpoint of propylene carbonate. Sixth, the use of $CO_2$ as a co-solvent may help reduce processing temperature to a temperature that is below a flashpoint of the solvent(s). As such, the use of propylene carbonate and/or $CO_2$ may provide increased safety and reusability compared to examples that operate at temperatures above the flashpoint of a solvent. Other carbonate solvents, and/or mixtures of carbonate solvents, may offer similar advantages.

The following alkoxide reactions are disclosed for the purpose of example. In the generation of a lithium alkoxide, a primary alcohol reacts with LiOH to produce a primary alkoxide and water, as shown in Equation 3. These may be produced with any alkali metal oxide, or metal. Any secondary, tertiary alcohols can be used, as well as diols, triols, and oligomers with alcohol functionality.

$$CH_3CH_2OH+LiOH \rightarrow CH_3CH_2OLi+H_2O \quad \text{(Eq 3)}$$

The alkoxide will react with primary alkyl halides with a substitution of the halide in high yields. For secondary halides along the polymeric backbone of PVDF, both substitution and elimination will proceed as shown below in Equation 4 (alkyl halide substitution) and Equation 5 (alkyl halide elimination). Either route degrades the macromolecular structure and binding function of PVDF.

$$(CF_2CH_2)_n+LiO—R \rightarrow LiF+(CH_2—C(OR)F)—(CF_2CH_2)_n \quad \text{(Eq 4)}$$

$$(CF_2CH_2)_n+LiO—R \rightarrow ROH+LiF+(CF_2CH_2)_n—(CF{=}CH)—(CF_2CH_2)_n \quad \text{(Eq 5)}$$

Although an alkoxide may react with metallic aluminum as shown in Equation 6, the reaction is not observed, and it is mitigated in the absence of water. In an example in which alcohol and/or water is present in high concentration, the pathway to aluminum alkoxide is a very slow corrosion reaction.

$$Al+3LiOR+3H_2O \rightarrow Al(OR)_3+3LiOH+3/2H_2 \quad \text{(Eq 6)}$$

For the act of removing PVDF from Al substrates, $k_{substitution}$ and $k_{elimination} >>>> k_{Al\ corrosion}$ so separation of Al from the reaction occurs well before any corrosion occurs.

Aluminum substrates in contact with alkoxides of ethylene glycol do not show any sign of gas formation consistent with oxidation of Al in a strong aqueous base.

Figure 2:
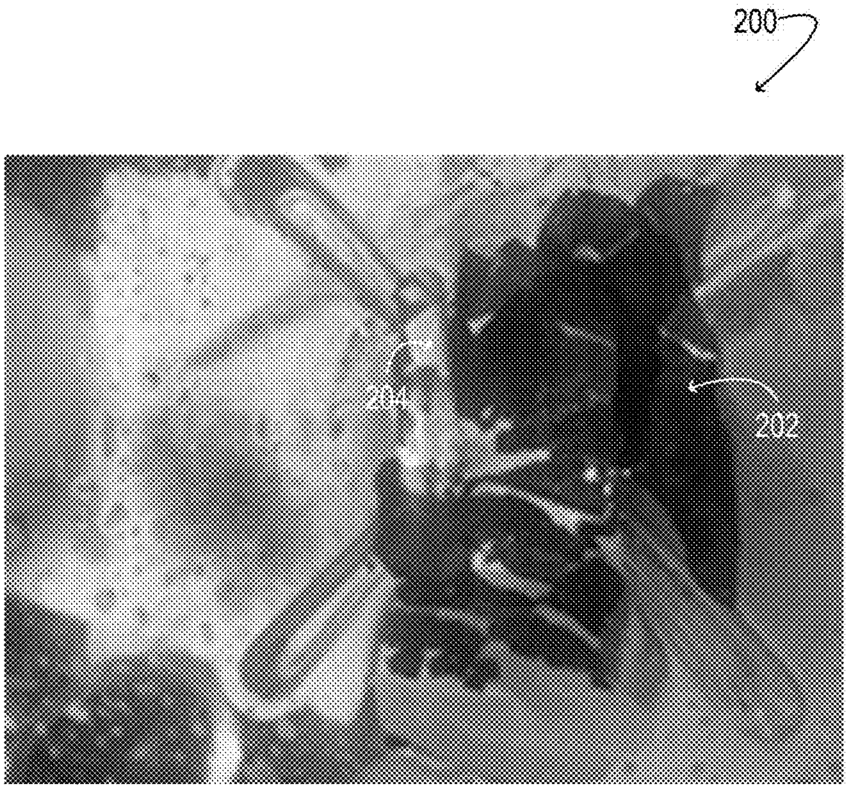
FIG. 2 shows an example battery delaminated from its current collector after treatment with an alkoxide.
Figure 5:
FIG. 5 shows a current collector with residual binder and electrode material after performing a control experiment in which delamination was performed without an alkoxide.

An example is shown below for the removal of PVDF/carbon black/NMC (lithium nickel manganese cobalt oxide) (approximately 7%/5%/88% by wt. where total wt. was 20 g) coated onto aluminum foil (approximately 1000 $cm^2$). The alkoxide was prepared by heating 100 mL of ethylene glycol in a container with 2 g of LiOH—$H_2O$ The coated electrode was placed into the $Et(OH)_2/Et(OLi)_2$ solution (150° C.) and stirred for 5 min. The electrodes were removed with tweezers and then agitated in a blender. Immediately, the laminated material flaked off from the aluminum current collector, allowing both the electrode material and the aluminum current collector to be recovered. FIG. 2 shows an example of a NMC battery 200 with a PVDF binder and electrode material 202 delaminated from the Al current collector 204 after treatment with the alkoxide. As a control, the same experiment was tested without addition of LiOH, and the binder and electrode materials remained laminated to the aluminum, as shown in FIG. 5.

Figure 3:
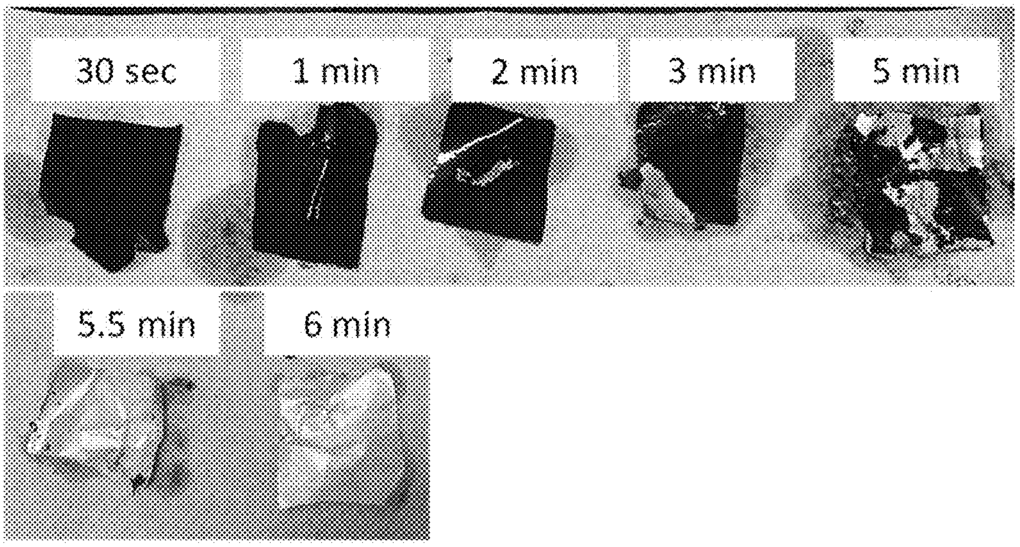
FIG. 3 shows example photos of a processed electrode and progression of electrode and binder material removal via harvesting with ethylene glycol and lithium hydroxide.
Figure 4:
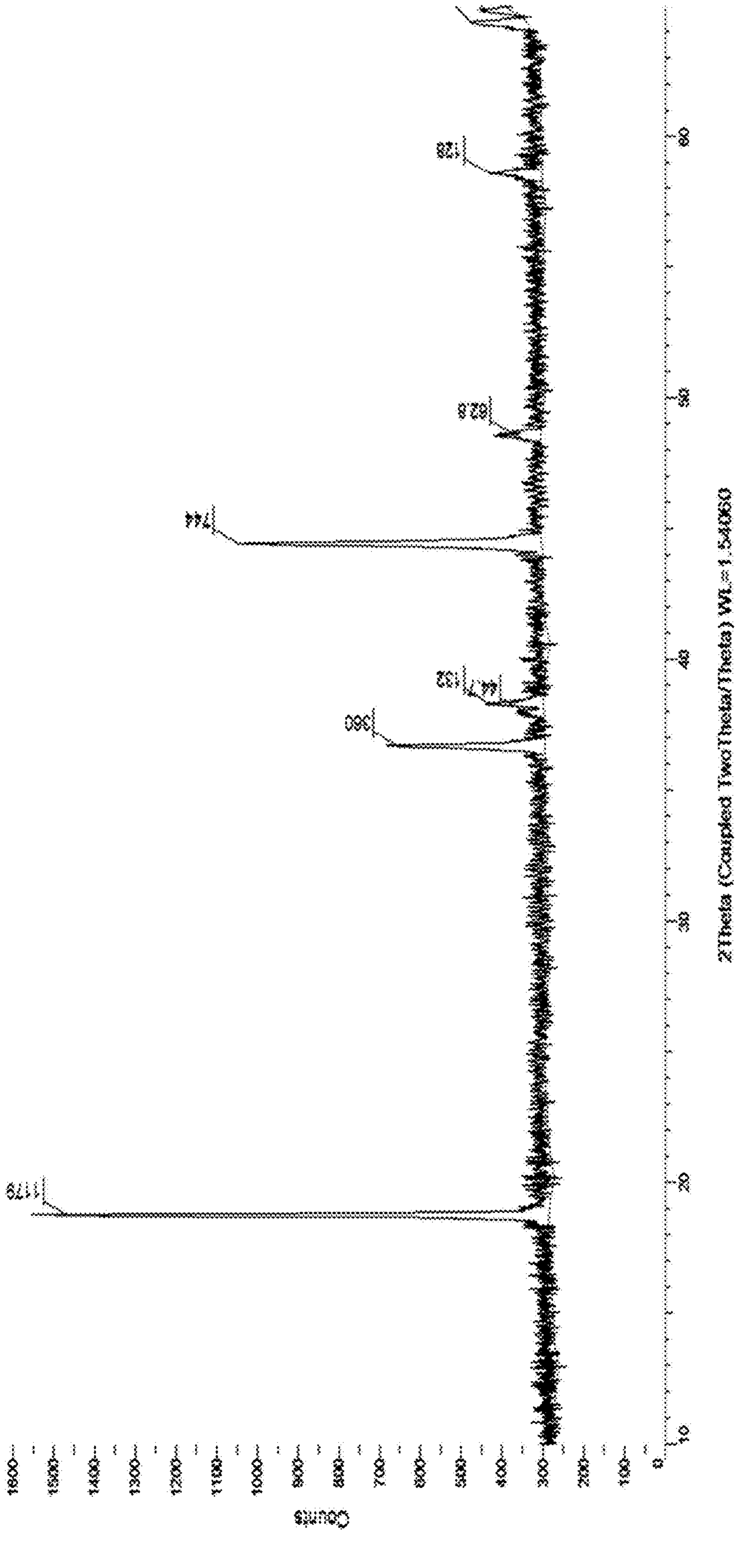
FIG. 4 shows a powder x-ray diffraction pattern for a harvested electrode material.

FIG. 3 shows example photos of a processed electrode and progression of binder removal after harvesting with 300 mL ethylene glycol and 3 g LiOH at 130° C. As shown, the binder came loose starting at 2-3 minutes and was completely removed after 6 minutes. Further, a crystal structure of the battery electrode material was maintained during harvest, as shown by the powder x-ray diffraction pattern of FIG. 4, which illustrates highly ordered AB planes of the NMC electrode material.

It will be understood that the configurations and/or approaches described herein are exemplary in nature, and that these specific embodiments or examples are not to be considered in a limiting sense, because numerous variations are possible. This disclosure also includes all novel and non-obvious combinations and sub-combinations of the above articles, systems, configurations, methods, and other features, functions, acts, and/or properties disclosed herein, as well as any and all equivalents thereof.

The specific processes described herein may represent one or more of any number of strategies. Some of the process steps described and/or illustrated herein may, in some embodiments, be omitted without departing from the scope of this disclosure, and/or additional steps may be used. Likewise, the indicated sequence of the process steps may not always be required to achieve the intended results, but is provided for ease of illustration and description. One or more of the illustrated actions, functions, or operations may be performed repeatedly, depending on the particular strategy being used.

The invention claimed is:

1. A method of processing a battery electrode assembly comprising a current collector, an electrode material, and a binder, the method comprising:

adding the battery electrode assembly to a solution comprising a metal alkoxide;

adding carbon dioxide ($CO_2$) to the solution, wherein adding the $CO_2$ to the solution comprises adding one or more of propylene carbonate, ethylene carbonate, dimethyl carbonate, diethyl carbonate, ethyl methyl carbonate, t-butyl carbonate, or poly(ethylene glycol) carbonate (n=1-10) to the solution;

separating the electrode material from the current collector; and recovering the electrode material.

2. The method of claim 1, wherein the metal alkoxide is non-aqueous.

3. The method of claim 1, further comprising forming the metal alkoxide by reacting an alcohol with a metal.

4. The method of claim 1, wherein adding the battery electrode assembly to the solution comprises placing the battery electrode assembly into an alcohol, then adding a metal source to the alcohol to form the metal alkoxide.

5. The method of claim 1, wherein adding the battery electrode assembly to the solution comprises placing the assembly into an alcohol, then adding a metal source to the alcohol to form the metal alkoxide.

6. The method of claim 5, wherein adding the metal source comprises adding a metal to the alcohol to form the metal alkoxide.

7. The method of claim 5, wherein adding the metal source comprises adding one or more of a metal oxide, metal carbonate, or metal hydroxide, to the alcohol to form the metal alkoxide.

8. A method of processing a battery electrode assembly comprising a current collector, an electrode material, and a binder comprising polyvinyl difluoride (PVDF), the method comprising:
- forming a solution of a lithium alkoxide from a lithium source and an alcohol;
- adding carbon dioxide ($CO_2$) to the solution, wherein adding the $CO_2$ to the solution comprises adding one or more of propylene carbonate, ethylene carbonate, dimethyl carbonate, diethyl carbonate, ethyl methyl carbonate, t-butyl carbonate, or poly(ethylene glycol) carbonate (n=1-10) to the solution;
- adding the battery electrode assembly to the solution;
- separating the electrode material from the current collector; and
- recovering the electrode material.

9. The method of claim 8, wherein the alcohol comprises one or more of ethanol, methanol, propanol, propane diol, ethylene glycol, glycerol, and polyvinyl alcohol.

10. The method of claim 8, wherein the lithium source comprises a lithium metal.

11. The method of claim 8, wherein the lithium source comprises one or more of lithium oxide, lithium carbonate, or lithium hydroxide.

12. The method of claim 8, further comprising heating the solution prior to recovering the electrode material.

13. The method of claim 8, further comprising agitating the solution prior to recovering the electrode material by thrashing in an aqueous solution comprising one or more of LiOH, KOH and NaOH after removal from the solution of the lithium alkoxide.

14. The method of claim 13, wherein the aqueous solution further comprises a surfactant.

15. The method of claim 8, further comprising removing the binder using the $CO_2$ after adding the battery electrode assembly to the solution.

16. A method of processing a battery electrode assembly comprising a current collector, an electrode material, and a binder comprising polyvinyl difluoride (PVDF), the method comprising:
- adding the battery electrode assembly to an alcohol;
- mixing a lithium source and into the alcohol to form a solution comprising lithium alkoxide;
- adding carbon dioxide ($CO_2$) to the solution, wherein adding the $CO_2$ to the solution comprises adding one or more of propylene carbonate, ethylene carbonate, dimethyl carbonate, diethyl carbonate, ethyl methyl carbonate, t-butyl carbonate, or poly(ethylene glycol) carbonate (n=1-10) to the solution;
- separating the electrode material from the current collector; and
- recovering the electrode material.

17. The method of claim 16, wherein the solution is non-aqueous.

18. The method of claim 16, further comprising adding one or more of a methacrylate or a poly(ethylene glycol) to the solution.

* * * * *